US007650592B2

(12) United States Patent
Eckels et al.

(10) Patent No.: US 7,650,592 B2
(45) Date of Patent: Jan. 19, 2010

(54) SYSTEMS AND METHODS FOR MULTI-VIEW DEBUGGING ENVIRONMENT

(75) Inventors: Josh Eckels, Seattle, WA (US); William Pugh, Seattle, WA (US)

(73) Assignee: Bea Systems, Inc., Redwood Shores, CA (US)

( * ) Notice: Subject to any disclaimer, the term of this patent is extended or adjusted under 35 U.S.C. 154(b) by 725 days.

(21) Appl. No.: 10/784,346

(22) Filed: Feb. 23, 2004

(65) Prior Publication Data

US 2004/0172623 A1    Sep. 2, 2004

Related U.S. Application Data

(60) Provisional application No. 60/451,368, filed on Mar. 1, 2003.

(51) Int. Cl.
G06F 9/44    (2006.01)
(52) U.S. Cl. .................. 717/125; 717/113; 717/127
(58) Field of Classification Search .................. 717/100, 717/125
See application file for complete search history.

(56) References Cited

U.S. PATENT DOCUMENTS

| | | | |
|---|---|---|---|
| 5,321,841 A | 6/1994 | East et al. | |
| 5,469,562 A | 11/1995 | Saether | 714/20 |
| 5,604,860 A | 2/1997 | McLaughlin et al. | 715/866 |
| 5,630,131 A | 5/1997 | Palevich et al. | 717/108 |
| 5,748,975 A | 5/1998 | Van De Vanter | |
| 5,801,958 A | 9/1998 | Dangelo et al. | |
| 5,835,769 A | 11/1998 | Jervis et al. | |
| 5,836,014 A | 11/1998 | Faiman, Jr. | |
| 5,862,327 A | 1/1999 | Kwang | |
| 5,867,822 A | 2/1999 | Sankar | |
| 5,944,794 A | 8/1999 | Okamoto et al. | 709/225 |
| 5,950,010 A | 9/1999 | Hesse | |

(Continued)

FOREIGN PATENT DOCUMENTS

| | | |
|---|---|---|
| CA | 2248634 | 3/2000 |
| WO | WO 99/23558 | 5/1999 |
| WO | WO 00/29924 A | 5/2000 |
| WO | WO 01/90884 A2 | 11/2001 |

OTHER PUBLICATIONS

ListViewItem Class, Microsoft .NET Framework Class Library, Jan. 2008. Online retrieved at <http://msdn.microsoft.com/enus/library/system.windows.forms.listviewitem.aspx>.*

(Continued)

*Primary Examiner*—Tuan Q Dam
*Assistant Examiner*—Thuy Dao
(74) *Attorney, Agent, or Firm*—Fliesler Meyer LLP

(57) ABSTRACT

A software debugging environment uses multiple abstract views to provide the flexibility required to perform effective debugging on an executing software program using data structures. Developers can select between one or more views to see different aspects of the software being examined. Each view can have a filter with specific properties determining which quantities are displayed, the format they are displayed in and any editing capability. In some embodiments, the selection of views, filters defining the views, and the editing properties for the contents shown in the views may be set interactively. In some cases, this interaction occurs through the interface of an Integrated Development Environment (IDE) containing the debugger. In other cases, the properties of views in the debugging environment are determined by definitions supplied in configuration files. Special facilities are provided for the debugging of JSP programs.

33 Claims, 2 Drawing Sheets

U.S. PATENT DOCUMENTS

| | | | |
|---|---|---|---|
| 5,961,593 A | 10/1999 | Gabber et al. | |
| 5,966,535 A | 10/1999 | Benedikt et al. | |
| 6,012,083 A | 1/2000 | Savitzky et al. | 709/202 |
| 6,016,495 A | 1/2000 | McKeehan et al. | 707/103 R |
| 6,018,730 A | 1/2000 | Nichols et al. | 706/45 |
| 6,023,578 A | 2/2000 | Birsan et al. | 717/105 |
| 6,023,722 A | 2/2000 | Colyer | |
| 6,028,997 A | 2/2000 | Leymann et al. | |
| 6,029,000 A | 2/2000 | Woolsey et al. | |
| 6,044,217 A | 3/2000 | Brealey et al. | |
| 6,067,548 A | 5/2000 | Cheng | |
| 6,067,623 A | 5/2000 | Blakley et al. | |
| 6,070,184 A | 5/2000 | Blount et al. | 709/200 |
| 6,092,102 A | 7/2000 | Wagner | |
| 6,119,149 A | 9/2000 | Notani | |
| 6,141,686 A | 10/2000 | Jackowski | |
| 6,141,701 A | 10/2000 | Whitney | 710/5 |
| 6,230,309 B1 | 3/2001 | Turner | |
| 6,212,546 B1 | 4/2001 | Starkovich et al. | 709/203 |
| 6,222,533 B1 | 4/2001 | Notani | |
| 6,226,675 B1 | 5/2001 | Meltzer et al. | |
| 6,230,287 B1 | 5/2001 | Pinard et al. | |
| 6,237,135 B1 | 5/2001 | Timbol | |
| 6,243,737 B1 | 6/2001 | Flanagan et al. | 709/202 |
| 6,282,711 B1 | 8/2001 | Halpern | |
| 6,292,932 B1 | 9/2001 | Baisley et al. | 717/114 |
| 6,311,327 B1 | 10/2001 | O'Brien et al. | 717/114 |
| 6,324,681 B1 | 11/2001 | Sebesta | |
| 6,330,569 B1 | 12/2001 | Baisley et al. | 707/203 |
| 6,334,114 B1 | 12/2001 | Jacobs et al. | 705/26 |
| 6,338,064 B1 | 1/2002 | Ault et al. | |
| 6,343,265 B1 | 1/2002 | Glebov et al. | 703/25 |
| 6,349,408 B1 | 2/2002 | Smith | |
| 6,353,923 B1 | 3/2002 | Bogle et al. | |
| 6,360,358 B1 | 3/2002 | Elsbree et al. | 717/120 |
| 6,367,068 B1 | 4/2002 | Vaidyanathan et al. | 717/143 |
| 6,377,939 B1 | 4/2002 | Young | 705/34 |
| 6,393,605 B1 | 5/2002 | Loomans | |
| 6,408,311 B1 | 6/2002 | Baisley et al. | 707/203 |
| 6,411,698 B1 | 6/2002 | Bauer et al. | 370/207.01 |
| 6,445,711 B1 | 9/2002 | Scheel et al. | 370/402 |
| 6,470,364 B1 | 10/2002 | Prinzing | 715/530 |
| 6,493,868 B1 * | 12/2002 | DaSilva et al. | 717/105 |
| 6,516,322 B1 | 2/2003 | Meredith | 707/102 |
| 6,549,949 B1 | 4/2003 | Bowman-Amuah | |
| 6,560,769 B1 | 5/2003 | Moore et al. | 717/100 |
| 6,567,738 B2 | 5/2003 | Gopp et al. | |
| 6,584,454 B1 | 6/2003 | Hummel et al. | 705/59 |
| 6,594,693 B1 | 7/2003 | Borwankar | |
| 6,594,700 B1 | 7/2003 | Graham et al. | 709/230 |
| 6,601,113 B1 | 7/2003 | Koistinen et al. | 719/316 |
| 6,604,198 B1 | 8/2003 | Beckman et al. | |
| 6,609,115 B1 | 8/2003 | Mehring et al. | 705/51 |
| 6,615,258 B1 | 9/2003 | Barry et al. | 709/223 |
| 6,636,491 B1 | 10/2003 | Kari et al. | 370/328 |
| 6,637,020 B1 | 10/2003 | Hammond | 717/107 |
| 6,643,652 B2 | 11/2003 | Helgeson et al. | 707/10 |
| 6,654,932 B1 | 11/2003 | Bahrs et al. | 715/507 |
| 6,678,518 B2 | 1/2004 | Eerola | 455/422.1 |
| 6,684,388 B1 | 1/2004 | Gupta et al. | 717/136 |
| 6,687,702 B2 | 2/2004 | Vaitheeswaran et al. | |
| 6,687,848 B1 | 2/2004 | Najmi | 714/4 |
| 6,721,740 B1 | 4/2004 | Skinner et al. | 707/10 |
| 6,721,747 B2 | 4/2004 | Lipkin | |
| 6,721,779 B1 | 4/2004 | Maffeis | 709/202 |
| 6,732,237 B1 | 5/2004 | Jacobs et al. | |
| 6,748,420 B1 | 6/2004 | Quatrano et al. | 709/205 |
| 6,754,884 B1 | 6/2004 | Lucas et al. | 717/108 |
| 6,757,689 B2 | 6/2004 | Battas et al. | |
| 6,789,054 B1 | 9/2004 | Makhlouf | 703/6 |
| 6,795,967 B1 | 9/2004 | Evans et al. | |
| 6,799,718 B2 | 10/2004 | Chan et al. | 235/375 |
| 6,802,000 B1 | 10/2004 | Greene et al. | |
| 6,804,686 B1 | 10/2004 | Stone et al. | |
| 6,823,495 B1 | 11/2004 | Vedula et al. | 715/805 |
| 6,832,238 B1 | 12/2004 | Sharma et al. | 709/201 |
| 6,836,883 B1 | 12/2004 | Abrams et al. | 717/140 |
| 6,847,981 B2 | 1/2005 | Song et al. | 707/104.1 |
| 6,850,979 B1 | 2/2005 | Saulpaugh et al. | 709/225 |
| 6,859,180 B1 | 2/2005 | Rivera | 343/709 |
| 6,874,143 B1 | 3/2005 | Murray et al. | 717/173 |
| 6,889,244 B1 | 5/2005 | Gaither et al. | 709/202 |
| 6,915,519 B2 | 7/2005 | Williamson et al. | 719/313 |
| 6,918,084 B1 | 7/2005 | Slaughter et al. | 715/513 |
| 6,922,827 B2 | 7/2005 | Vasilik et al. | 717/140 |
| 6,950,872 B2 | 9/2005 | Todd, II | 709/227 |
| 6,959,307 B2 | 10/2005 | Apte | |
| 6,963,914 B1 | 11/2005 | Breitbart et al. | 709/226 |
| 6,971,096 B1 | 11/2005 | Ankireddipally et al. | 718/101 |
| 6,976,086 B2 | 12/2005 | Sadeghi et al. | 709/236 |
| 7,000,219 B2 | 2/2006 | Barrett et al. | 717/107 |
| 7,017,146 B2 | 3/2006 | Dellarocas et al. | 717/106 |
| 7,043,722 B2 | 5/2006 | Bau, III | 717/151 |
| 7,051,072 B2 | 5/2006 | Stewart et al. | 709/204 |
| 7,051,316 B2 * | 5/2006 | Charisius et al. | 717/103 |
| 7,054,858 B2 | 5/2006 | Sutherland | 707/4 |
| 7,062,718 B2 | 6/2006 | Kodosky et al. | 715/771 |
| 7,069,507 B1 | 6/2006 | Alcazar et al. | 715/530 |
| 7,072,934 B2 | 7/2006 | Helgeson et al. | 709/203 |
| 7,073,167 B2 | 7/2006 | Iwashita | 717/140 |
| 7,076,772 B2 | 7/2006 | Zatloukal | 717/147 |
| 7,096,422 B2 | 8/2006 | Rothschiller et al. | 715/513 |
| 7,107,578 B1 | 9/2006 | Alpern | 717/124 |
| 7,111,243 B1 | 9/2006 | Ballard et al. | 715/744 |
| 7,117,504 B2 | 10/2006 | Smith et al. | 709/201 |
| 7,127,704 B2 | 10/2006 | Van De Vanter et al. | 717/112 |
| 7,143,186 B2 | 11/2006 | Stewart et al. | 709/245 |
| 7,146,422 B1 | 12/2006 | Marlatt et al. | 709/227 |
| 7,155,705 B1 | 12/2006 | Hershberg et al. | 717/137 |
| 7,184,967 B1 | 2/2007 | Mital et al. | 705/8 |
| 7,240,331 B2 | 7/2007 | Vion-Dury et al. | 717/117 |
| 7,260,599 B2 | 8/2007 | Bauch et al. | 709/202 |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | |
| 2002/0035604 A1 | 3/2002 | Cohen et al. | |
| 2002/0073396 A1 | 6/2002 | Crupi et al. | |
| 2002/0078365 A1 | 6/2002 | Burnett et al. | |
| 2002/0083075 A1 | 6/2002 | Brummel et al. | |
| 2002/0111922 A1 | 8/2002 | Young et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0174178 A1 | 11/2002 | Stawikowski | |
| 2002/0174241 A1 | 11/2002 | Beged-Dov et al. | |
| 2002/0184610 A1 | 12/2002 | Chong et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau, III et al. | |
| 2003/0014439 A1 | 1/2003 | Boughannam | |
| 2003/0018661 A1 | 1/2003 | Darugar | |
| 2003/0018665 A1 | 1/2003 | Dovin et al. | |
| 2003/0018832 A1 | 1/2003 | Amirisetty et al. | |
| 2003/0023957 A1 | 1/2003 | Bau et al. | |
| 2003/0028579 A1 | 2/2003 | Kulkrni et al. | |
| 2003/0041198 A1 | 2/2003 | Exton et al. | |
| 2003/0043191 A1 | 3/2003 | Tinsley et al. | |
| 2003/0046266 A1 | 3/2003 | Mullins | |
| 2003/0046591 A1 | 3/2003 | Asghari-Kamrani et al. | |

| | | | |
|---|---|---|---|
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0084203 A1 | 5/2003 | Yoshida et al. | |
| 2003/0110117 A1 | 6/2003 | Saidenberg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2004/0019645 A1 | 1/2004 | Goodman et al. | |
| 2004/0040011 A1 | 2/2004 | Bosworth et al. | |
| 2004/0078373 A1 | 4/2004 | Ghoneimy et al. | |
| 2004/0103406 A1 | 5/2004 | Patel | |
| 2004/0133660 A1 | 7/2004 | Junghuber et al. | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0225995 A1 | 11/2004 | Marvin et al. | |
| 2004/0260715 A1 | 12/2004 | Mongeon et al. | |
| 2005/0050068 A1 | 3/2005 | Vaschillo et al. | |
| 2005/0278585 A1* | 12/2005 | Spencer | 714/46 |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

OTHER PUBLICATIONS

"JSTL: JSP Standard Tag Library Kick Start", Book Publisher Sams, Sep. 2002, Chapters 1, 2 and 12 (73 pages). Online retrieved at Safari Books Online.*

"Using active server pages and simulation techniques to create virtual M&M's", R. Snyder, Jan. 2001, pp. 246-255. Online retrieved at <http://delivery.acm.org/10.1145/370000/369370/p249-snyder.pdf>.*

"An online programming assessment tool", Roberts et al., Jan. 2003, pp. 69-75. Online retrieved at <http://delivery.acm.org/10.1145/860000/858412/p69-roberts.pdf>.*

"The Big Bang Theory of IDEs", C. Boekhoudt, Oct. 2003, pp. 74-82. Online retrieved at <http://delivery.acm.org/10.1145/960000/957775/boekhoudt.pdf>.*

Int'l Search Report for PCT/US04/05427, Feb. 10, 2005, PCT.

Int'l Search Report for PCT/US04/05479, Dec. 3, 2004, PCT.

Marcello Mariucci, "Enterprise Application Sever Development Environments," University of Stuttgat, Overview, Oct. 10, 2000, p. 1-10.

Sun Microsystems, "IPlanet Application Server 6.0 White Paper," Technical Reference Guide, May 25, 2000, all, fig. On p. 20.

Roman, Ed. And Rickard Oberg, "The Technical Benefits of EJB and J2EE Technologies over COM+ and Windows DNA," Dec. 1999, pp. 3-5, fig. 1.

Hewlett-Packard, "HP Application Server," Technical Guide, version 8.0, 1999-2001, all.

Duvos, E. and Besavos, A., "An Infrastructure for the Dynamic Distribution of Web Applications and Services," Dept. of Computer Science, Boston University, Dec. 2000, pp. 4-12.

Kunisetty, "Workflow Modeling and Simulation Using an Extensible Object-Oriented Knowledge Base Management System," CiteSeer, 1996, pp. 1-60.

Van Der Aalst et al, "Verification of XRL: An XML-Based Workflow Language," IEEE, Jul. 2001, pp. 427-432.

Blake, "Rule-Driven Coordination Agents: A Self-Configurable Agent Architecture for Distributed Control," IEEE, Mar. 2001, pp. 271-277.

Dahalin et al, "Workflow Interoperability Using Extensible Markup Language (XML)," IEEE, Jul. 2002, pp. 513-516.

Erich Liebmann, et al., "Adaptive Data Dissemination and Caching for Edge Service Architectures Built with the J2EE", Mar. 2004, ACM Press, 2004 ACM Symposium on Applied Computing, pp. 1717-1724.

Sosnoski, "XML and Java Technologies: Data Binding, Part 1: Code Generation Approaches—JAXB and More", IBM, Jan. 1, 2003, pp. 1-11; http://www-128.ibm.com/developerworks/library/x-databdopt/index.html.

Embury, S.M., et al., "Assisting the Comprehension of Legacy Transactions", Proceedings of the Eighth Working Conference on Reverse Engineering, Oct. 2-5, 2001, © 2001 IEEE, pp. 345-354.

Mays, E., et al., "A Persistent Store for Large Shared Knowledge Bases", IEEE Transactions on Knowledge and Data Engineering, Mar. 1991, vol. 3, Issue 1, © 1991 , pp. 33-41.

Tang, C., et al., "Integrating Remote Invocation and Distributed Shared State", Proceedings of the 18th International Parallel and Distributed Processing Symposium, (IPDPS '04), © 2004 IEEE, Apr. 26-30, 2004, 10 pages.

JAVA Debug Interface-definition, retrieved from <URL http://java.sun.com/j2se/1.4.2/docs/guide/jpda/jdi/overview-summary.html on Feb. 21, 2007, 3 pages.

Kilgore, R.A., Multi-Language, Open-Source Modeling Using the Microsoft.NET Architecture, Proceedings of the Winter Simulation Conference, Dec. 8-11, 2002, © 2006, IEEE, pp. 629-633.

Chen, et al., "eCo Architecture for Electronic Commerce Interoperabillity", CommerceNet eCo Framework Project, Jun. 29, 1999, © 1999 by CommerceNet, Inc., pp. 1-107.

Microsoft, "Microsoft.net Framework", © 2001, Microsoft Corporation, Redmond, WA, USA, pp. 1-50.

Willink, E., "Meta-Compilation for C++", Jan. 4, 2000, University of Surrey, Guildford, Surrey, England, 379 pages.

Bogunovic, N., "A Programming Model for Composing Data-Flow Collaborative Applications", R. Boskovic I29924 Anstitute, Zagreb, 10000, Croatia, IEEE, Mar. 1999, 7 pages, retrieved Apr. 10, 2007.

Sung, S.Y., et al., "A Multimedia Authoring Tool for the Internet", © 1997 IEEE, pp. 304-308, retrieved Apr. 10, 2007.

Smith, M., et al., "Marching Towards a Software Reuse Future", ACM Ada Letters, vol. XIV, No. 6, Nov./Dec. 1994, pp. 62-72, retrieved Apr. 10, 2007.

Mohan, C., et al, "ARIES: A Transaction Recovery Method Supporting Fine-Granularity Locking and Partial Rollbacks Using Write-Ahead Logging", © 1992, ACM Transactions on Database Systems, vol. 17, No. 1, Mar. 1992, pp. 94-162.

Bea, "Transforming Data Using Xquery Mapper", BEA AquaLogic Service Bus. 2.0 Documentation, 2006, pp. 1-19.

Stylus Studio, "Xquery Mapper", Stylus Studio®, Jun. 5, 2007, pp. 1-6; http://www.stylusstudio.com/xquery_ mapper.html.

Altova, "XML-to-XML Mapping", Altova MapForce®, 2007, pp. 1-3.

Jamper, "Jamper-Java XML Mapper", Sourceforge.Net®, Jun. 6, 2007, pp. 1-4; http://jamper.sourceforge.net/.

Alonso, G., et al., "Advanced Transaction Models in Workflow Contexts", Proceedings of the 12th International Conference on Data Engineering, Feb. 1996, retrieved from: http://citeseer.ist.psu.edu/alonso96advanced.html.

Van Der Alst, WMP, et al., "XML Based Schema Definition for Support of Inter-organizational Workflow", University of Colorado and University of Eindhoven report, 2000, retrieved from: http://citeseer.ist.psu.edu/vanderaalst00xml.html.

Plaindoux, D., "XML Transducers in Java", Proceedings of the 11th International World Wide Web Conference, Sheraton Waikiki Hotel, Honolulu, HI, USA, May 2002, retrieved from: http://www2002.org/CDROM/poster/132/index.html.

Supplementary European Search Report, EP02784131.1—1243—PCT/US/0233098, Aug. 8, 2007, 4 pages.

Allamaraju, et al., "Professional Java Server Programming J2EE 1.3 Edition", WROX, XP-002442953, ISBN: 1-861005-37-7, Sep. 2001, p. 1009-p. 1057.

Sun Microsystems: "J2EE™ Connector Architecture 1.0", XP-002442954, Aug. 2001; retrieved from the Internet: URL: http://java.sun.com/j2ee/connector/download.html>.

* cited by examiner

SYSTEMS AND METHODS FOR MULTI-VIEW DEBUGGING ENVIRONMENT

CLAIM OF PRIORITY

This application claims priority from the following application, which is hereby incorporated by reference in its entirety:

U.S. Provisional Patent Application No. 60/451,368, entitled "Systems and Methods for Multi-View Debugging Environment" by Josh Eckels and William Pugh, filed Mar. 1, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the debugging of an executing software program.

BACKGROUND

Many software programs contain complex data structures, and software developers rely on predefined libraries data structures (e.g. classes), or create their own libraries. In these cases, when a developer encounters a debugging problem in executing a software program, they are sometimes more interested in investigating the abstract contents of the data structures, i.e., the attributes of their interests during the execution of the software program, rather than the physical structures used to represent the abstract contents. Unfortunately, existing debugging systems or "debuggers" often present developers with internal details of these structures, which makes it difficult to determine the abstract contents of actual interest. For example, the developer might use a data structure called a List to represent an ordered collection of items on an invoice. In the debugger, the developer might wish to see the list of items and their attributes (e.g., quantity, price, description). However, internally the List data structure is implemented as a linked list of nodes. Therefore, in order to understand or monitor the contents of the List using a prior art debugger, the developer has to follow a long series of pointers between nodes and examine variables names along the way, such as nodeptr and nextptr that have little to do with the list of invoice items the developer wants to monitor.

In some cases, this extraneous information can include details of the data structures created by the supplier of a library, and for which the developer may have poor facilities for understanding. Even if the developer understands the objects and structures, the problem they are addressing may be focused on the abstract content represented by the data structure, rather than the physical structure.

In addition to these problems, some existing software debuggers provide little or no control over the format for presentation of the information and have little or no editing capability for data values within objects or data structures. Thus, in many cases, the software developer is presented with unwanted information, rigidly formatted, and with limited or no editing capability.

In addition to the difficulties discussed above, debugging of Java Server Pages (JSP pages) presents a unique set of difficulties. These difficulties arise from a number of sources inherent in the way JSP pages are developed and deployed. In many cases, the code executed to implement the JSP page is "machine generated" and is embedded into a servlet running in a complex runtime environment. Thus, it may be very difficult for a developer to understand the mapping between the JSP source code they have created and wish to debug, and the machine generated code they would see through an existing debugger applied to the runtime environment. Further complicating this situation is the common use of tags that redirect the execution path within the JSP page. Also, JSP pages also consume and produce streams of data.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Figure 1:
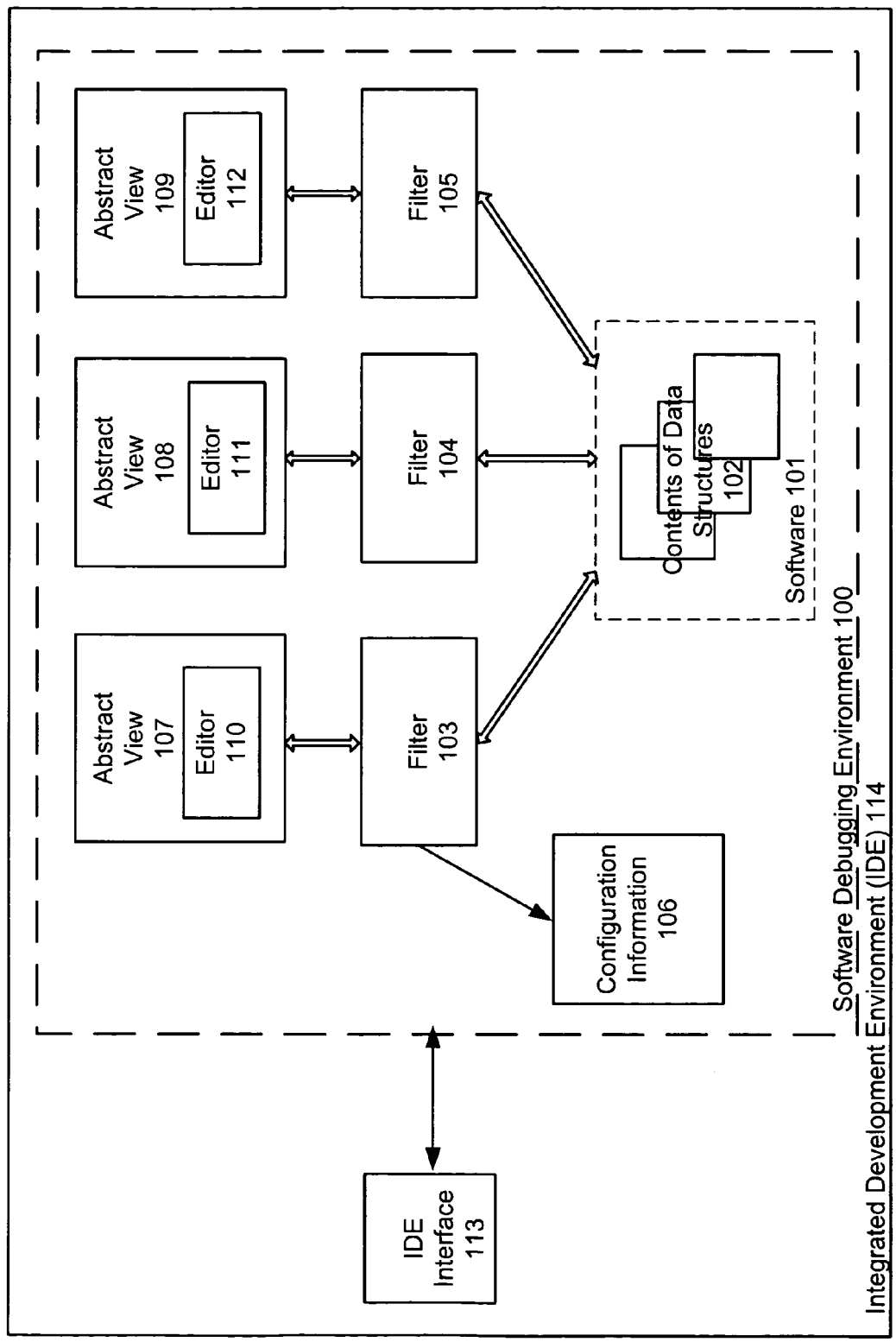
FIG. 1 is a diagram showing a software debugging system that can be used in accordance with one embodiment of the present invention.

FIG. 1 illustrates systems and methods in accordance with some embodiments of the present invention that can provide software developers with a software debugging environment. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

Referring to FIG. 1, the software debugging environment 100 is capable of utilizing multiple viewing capabilities to provide debugging flexibility when executing a software program 101 having one or more data structures. Developers can select between one or more abstract views 107, 108, and 109, which are views displaying only the abstract contents of interest to the developer during the execution of the software program, in order to see different abstract content(s) 102 of one or more data structures of the software program being executed. Each abstract view can have a filter 103, 104, or 105, which has specific properties determining which contents of a data structure are displayed, the format in which they are displayed, and how the underlying data structure can be modified through the abstract view. In some embodiments, the selection of views, filters defining the views, and the editing of the contents of the data structures shown in the views can be set interactively. In some cases, this interaction can occur through an interface 113 of an Integrated Development Environment (IDE) 114 containing the debugger. In other cases, the filters of views in the debugging environment can be determined by configuration information supplied in a file 106, and perhaps by the context. In some embodiments, two or more views of the same content(s) of a data structure can be simultaneously displayed for the developer.

In one embodiment, a developer can view the abstract contents of a data structure, rather than viewing the actual internal details of how the contents are stored in memory. A filter may extract the contents of interest from the data structure and format them for display to the user. For example, a Java language developer may not care about the internal data structures used to implement an array list such as java.util.ArrayList, but would like to view the abstract contents such as the items stored in the list. As another example, a debugger can make extensive use of a viewing mechanism for a developer examining the contents contained in a Java Servlet Page (JSP), without the need to see the surrounding structure or the generated servlet code.

In some embodiments, a view can also include customized editors 110, 111, and 112, allowing the user to set values for the displayed abstract contents of a data structure through an abstract view. In some embodiments, the editor may perform validation of the user's input against allowed values for the contents. In some embodiments the user, possibly in the IDE environment, can set the properties of the editor interactively via a filter. In some embodiments, the properties of the editor are defined in configuration files. In some embodiments, the editors may provide the capability set multiple underlying contents in a single operation. As an example of an editor in a customized view, an editor for java.awt.Color can provide a color selection dialog as its editor.

In some embodiments, a user can select various views to display by toggling each one of them on and off individually. The ability to toggle the views can be useful if a user wishes to view a content's underlying data structure, for example. As another example, a user can select multiple views to be displayed simultaneously. As an example, the user may be able to right-click on a node in the local content windows or watch windows and set it to use any of the one or more views that match for its content's type. Ideally, there will be at least one match for that type.

In some embodiments, filtering is performed in an IDE. The filters can extract, and in some instances format, the information to be displayed in a particular abstract view. In some embodiments the filters are arbitrarily configurable (e.g. they may be defined in a language, such as an XML). In some cases, a configuration file can be used to define the properties of the filter. In other cases the user may set the properties of the filter, and may do so interactively and/or using the facilities of the IDE. In some cases filters can be applied to data in a runtime-messaging environment.

As an example, a developer may wish to look at the contents of a customer order. The developer may not need to see how the order is constructed, such as whether the items in the order are contained within a linked list of data structures. Filters can be defined to extract the local contents of interest (i.e. item name, item price, quantity) and display those contents in one or more convenient formats. For some contents the developer may only wish to see the character representation. For other contents, the developer may only wish to see decimal numeric representations, or an integer and hexadecimal representation (2 views) may be desired. A debugger according to some embodiments in the present invention can apply the appropriate filters to extract the desired contents and transformation those contents to the desired display formats. The views of these contents can be displayed in the IDE. If a developer wishes to change a view to see another representation of some contents, eliminate contents from the view, or add contents to a view, the developer can do so either interactively, such as through the IDE or by changing a configuration file.

In some embodiments, one or more special facilities can be included to support the debugging of a JSP page and the machine generated servlets that implement it. These faculties can be applied in a coordinated manner, along with capabilities already described to create a complete environment for efficiently debugging JSP pages. These facilities can include, for example:

use of special purpose filters to extract, display code and values of contents of interest, and map the code and values to the formats used in a source code in a JSP page, for use with executing JSP servlets;

the ability to follow execution paths through several levels of redirection; and the use of specialized filters to extract data from and manipulate the contents of buffers used to transmit and receive streaming data.

In some embodiments, tags can be used to redirect the execution path within a JSP page. An effective debugger can follow this flow of execution correctly, especially in cases where a developer is interested in debugging the code in the redirection path. As an example, JSP developers typically use one or more tag libraries, which can be standard libraries or specially developed libraries, to define functionality without the need to reproduce large amounts of code in line.

In one embodiment, JSP pages can consume and produce streams of data. In such cases it can be necessary for an effective debugger to provide access into buffers, for completed and in-progress streams, to allow the developer to view, and possibly manipulate, contents. As an example, a JSP may use one or more buffers to receive and transmit HTTP streams during execution.

The follow discussion provides exemplary implementation of abstract views for debugging that can be used in accordance with various embodiments. Throughout this discussion, an example is developed using the Java programming language. It should be understood that the advantages obtained through these enablements can be obtained using other programming languages as known and used in the art. Further, it should be understood that a wider range of views can be created and defined, in Java or another programming language, and that the scope of the invention is not defined by these examples.

A view for byte, short, char, int, and long can present a user with the option for two views each, one for showing the value in hex and one for showing the value in decimal. Decimal may be the default. In some cases, the editors may not allow non-numeric data or accept values that are beyond the minimum or maximum values for each type.

A view for char can present the user with the choice of views showing the character value, a Unicode escape syntax value, and the hex value. The default view may show a single quoted character. The editor may not allow the user to enter more than one character or a valid Unicode escape value.

A view for float and double can present the user with a single view for these two types that shows the default string representation of their types (including "NaN", defined in IEEE floating point number standards, etc). The editor may only allow the user to enter a value that will parse as a float or double. In some cases alternative views (e.g. showing hex values) may be available.

A view for Boolean can display "true" or "false", or alternatively, "1" and "0". The editor may only allow the two valid values as input.

A view for array can show a selected range of array elements as children. Users may be able to easily select what elements are to be shown. The node corresponding to the array itself should display the type of the array and its length. Editing support may correspond to the elemental types in the array. In some embodiments, no editing is provided in the view.

For developers using the Java programming language, one or more views for java.util.List can provide access to the contents of list objects. This view may show the list as an array of the same length, letting the user choose the range of indices to display. Editing support may correspond to the elemental types in the array. In some embodiments, no editing is provided in the view.

For developers using the Java programming language, one or more views for java.util.Set can provide access to the contents of set objects. The view can show the set as an array of the same length, letting the user choose the range of indices to display. Editing support may correspond to the elemental types in the array. In some embodiments, no editing may be provided in the view.

For developers using the Java programming language, one or more views for java.util.Map may provide access to the contents of map objects. These views may show the key-value pairs as an array of the same length. Those nodes can be expanded and contain two children, the key and the value objects. Editing support may correspond to the elemental types in the array, and may place restrictions on key values. In some embodiments, no editing is provided in the view.

For developers using the Java programming language, one or more views for java.util.Date and java.util.GregorianCalendar may provide display the underlying date and time in these objects. The editor may use a SimpleDateFormat to validate the value before passing it into a date object.

For developers using the Java programming language, one or more views for java.lang.StringBuffer may provide access to the current length, current capacity, and string contents. Editing support may be supplied for the elemental character values, or not at all.

For developers using the Java programming language, one or more views for java.awt.* and javax.swing.* classes can provide access to the contents of these data structures. For example, Containers might have an easy way to see their children without having to dive into the internal implementations. Other views might be simpler, like the java.awt.Color example above, or a summary view of java.awt.Dimension that shows its height and width at the root node instead of making the user drill down into its children.

In some embodiments, views can be at least partly defined using an XML-based language. A number of definition parameters can be defined for views. Some embodiments may use additional parameters, or eliminate some of the parameters discussed. Some possible examples include:

A "priority" parameter may be assigned to the view. For values that match more than one view, the view with the highest priority can be chosen by default. All of the matching views can be available to the user on a right-click, sorted by priority.

A "value type" parameter defines type displayed in the view. For example, a value type can be either the string that the debugger will report for the value's type or "*". The latter indicates the view is valid for all expression values.

A "view class" parameter defines the name of a class that implements in the view. In some embodiments using the Java language this may be implemented as a class, such as com.bea.ide.debug.IDebugExpressionView.

A "description" parameter may be a string that will be shown to describe the view after right-clicking on an expression in the locals or watch windows.

In some embodiments an "invalidates default" attribute may be set to true, if the view matches an expression's type exactly. Any views with a valueType of "*" will not be included in the list of matching views for a given type. This capability is used when there is no need in the default view for primitive types, which which will generally have client-side validation.

As an example, a debugger view definition can use a construct of a form such as:

```
<extension-xml id="urn:com-bea-ide:debugExpressionViews">
    <view priority="PRI" valueType="VALUE_TYPE"
    class="VIEW_CLASS"
        invalidatesDefault="true" description="DESCRIPTION" />
</extension-xml>
```

Each debugger view can address the possibility that the contents being accessed may not be in an internally consistent state. For example, if an implementation of java.util.List has an int member variable for its length and an array member variable to hold its elements, the debugger view may have to display the list in the middle of an add operation when the length member variable is 11 but the array member variable is only 10 elements in length.

In some embodiments, views can be implemented using method calls. Such implementations may need to use techniques to prevent potential deadlocks that can arise, for example, since Java Debug Interface (JDI)'s method invocation respects object monitor locking in a Java language environment. To avoid these potential deadlocks, the view may require knowledge of the implementation of a class, even when it could retrieve all its needed data through method calls. For example, using method calls a single view could be used for all java.util.Lists, but a view may require knowledge of the internal structure of java.util.ArrayList, java.util.LinkedList, etc, if method calls are not used. Safeguards may be implemented to prevent any changes to the implementation of those classes causing failures while executing one or more of the views.

In some embodiments, the names used to identify modules can reflect the names used for the source files, to prevent user confusion. As an example, when debugging a JSP, the views for debugging should show the name of the source .jsp file instead of the generated servlet .java file. The user may remain fairly ignorant of the generated servlet file, and the names used, altogether.

Some embodiments can apply one or more specific filters to viewing and manipulating values used in JSP pages and the servlets generated to implement them. In general, these filters can be intended to hide contents internal to the runtime environment, and just present the user with the information they would be able to get programmatically from within a JSP page. The user can toggle between the filtered view and the full view, which can include, for example, a default Java object view.

Some examples of suitable filters are shown below. In some cases, these examples assume the Java programming language is used for the JSP page or machine generated servlet code and the HTTP protocol is used for streaming data communications.

URL information, including port, query string, etc.
HTTP method, including post, get, etc.
HTTP headers, including name, value, etc.
Parameters, including name, value, etc.
Attributes, including name, value, etc.
Cookies, including name, domain, max age, value, etc.
Session information, including session ID, values, session length, etc.

Some embodiments can contain facilities to accommodate the use of tags and tag libraries. One or more filters can be used to extract and display information of interest when tags and tag libraries are encountered. This capability can include the ability to follow (or not follow as required) the execution of the program through one or more redirections and can allow the user to view the current streams, relative to the tag library. This information can be useful in many situations including, with nested tags, the output from one tag library can become the input for a different tag library and where the intermediate data is never sent to the final output stream. Some embodiments can provide the user with control over which tag libraries are viewed and which are skipped.

Some embodiments can include the capability to examine the contents of data streams. Contents of the buffers and information concerning the buffers can be extracted and displayed using one or more filters. Local watch windows can use debugger views to display some summary information about the streams (for example, the number of bytes that have been written to the stream, how many bytes are still in the buffer, etc). A user can click for a dialog with the full contents of the stream in addition to the same summary information. The user may be able to toggle between text and binary views of the streams, or show both views at the same time. For commonly used streams, like the output of JSP to the client, there can be an additional debugger window. In some embodiments, the view of the stream, and possibly the filters applied, may differentiate between flushed and buffered bytes.

Some embodiments can extract the streaming data by inserting a wrapper or "writer" class around the JSP servlet. For example, a wrapper class may be placed around a JSP in the runtime environment. The wrapper or "writer" can capture all of the stream output or input as it is written, and may also control clearing the buffer. In some embodiments, the IDE may detect local contents whose values are objects for the wrapper class and present them to the user as a list of streams. The user can select a stream, and the IDE will inspect though the wrapper to determine the contents of the stream and possibly determine how much contents have already been flushed.

Some embodiments can allow the definition of breakpoints, such as for JSP page debugging. These breakpoints can be defined for the user written code of the JSP page, the tags or the tag library or the machine generated servlet code. For example, in a JSP, breakpoints may be defined for lines with Java code, JSP tags, or tag library calls. In some embodiments, breakpoints set on lines without a defined breakpoint type may be ignored.

Stepping though the execution of a page such as a JSP page can be quite different from stepping though ordinary code. In many cases the developer may not wish to see the actual machine generated code of the servlet stepped through, but rather something that resembles the source code they have written. In some cases, a developer may wish to examine code within tag libraries, such as when the developer is developing a tag library, or attempting to find a bug in someone else's tag library. In other cases, a developer may not want to see the contents of a tag library, such as when a predefined tag library is being used. For example, these developers may view tag libraries in a similar way to the way Java developers view the Java collections classes—something to be used but not debugged.

In some embodiments, users can set method breakpoints within specific tag libraries. The debugger and IDE may inspect the JSP page and possibly deployment descriptors to determine the classes and methods implemented within the tag library. Generally, only methods specified by the tag library interfaces will be shown, and the list may be filtered further to only include methods for which source code is available. In some embodiments, these results can be displayed in the IDE and the user may be able to right click on a tag library, possibly using a source view, to access this functionality. The breakpoints created can show up as normal method breakpoints in both the breakpoint window and the source editor.

In some embodiments, stepping out of a tag library method, or stepping over off the end of the method, will cause the debugger to continue on to the next tag library method that has been enabled as a step into location. If the last location has been passed, the debugger can step to the next action in the JSP page. Between the tag library methods, the debugger may step back to the JSP source. In some cases the user may not be able to tell which method call just completed or which call will be next, by examining the JSP page source. However, in these cases, the user can use the tag library breakpoints functionality to control which tag library methods get hit.

The following table shows some possible examples of breakpoints for JSP pages using the Java programming language and HTTP transport protocol:

TABLE 1

Exemplary Breakpoints for JSP Pages in Some Embodiments

| Current location | Action | Result |
|---|---|---|
| Call in a JSP to a tag library | Step in | Steps into the next call to the tag library |
| | Step over | Steps to next JSP action |
| | Step out | Finishes the JSP request |
| Tag library code | Step in | Normal Java step in |
| | Step over | Normal Java step over, stepping off the end of the tag library method steps back to the tag library call in the JSP |
| | Step out | Steps back to the tag library call in the JSP |
| Java code snippet | Step in | Performs a normal Java step in, stepping in to the method call if present |
| | Step over | Performs a normal Java step over, stepping to the next line of Java code in the snippet or to the next JSP action |
| | Step out | Finishes the JSP request |
| "<%= value %>" syntax | Step in | Steps to the next JSP action |
| | Step over | Steps to the next JSP action |
| | Step out | Finishes the JSP request |
| Unescaped HTML | N/A | Not breakpointable or stoppable |

In some embodiments, a JSP debugger can provide a user interface, possibly as part of the IDE. Such IDE can be implemented on any Java-based application platform, such as the commonly used WebLogic developed by Bea Systems. This user interface may include some of the functionality discussed here. The specific examples in this section are for use with JSP pages using the Java programming language.

Figure 2:
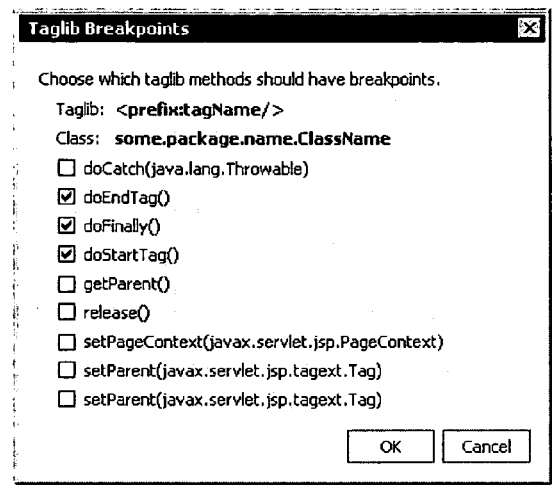
FIG. 2 is an exemplary GUI for debugging of a JSP page in accordance with one embodiment of the invention.

Some embodiments can include a dialog, such as that shown in FIG. 2, to allow a user to select which method(s) in the tag library should be hit when stepping into a tag library tag from a JSP. The dialog may only let the user select the tag library methods for which the IDE can find source code. It may not show tag library methods that a super class implements, but for which the IDE couldn't find the source code. This may be a common case with Java, for example, since many tag library implementations will extend TagSupport, and most users won't have the source for the JSP API. In some embodiments, this dialog may also show the implementing class' name, as well as the tag that refers to that class (for example, <prefix:tagName/>), possibly as a header.

Other useful information displayed can include the class that actually implements the method (since a tag library may not override its superclass's implementation), and the tag library interface that specifies the method. This can be done as a tooltip for each of the checkboxes.

Figure 3:
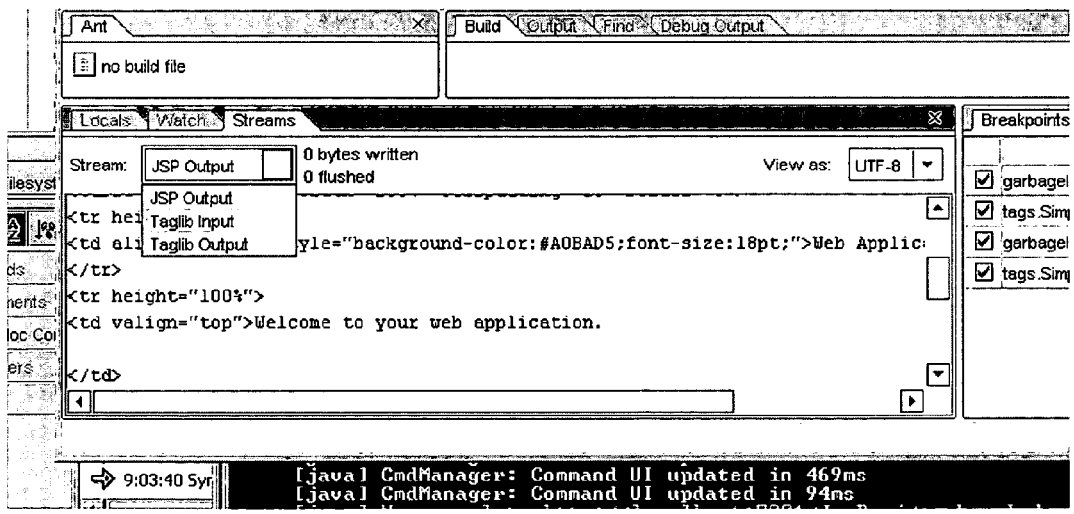
FIG. 3 is an exemplary GUI for debugging of a JSP page in accordance with one embodiment of the invention.

Some embodiments can include one or more stream windows as shown in FIG. 3 to allow a user to inspect the contents of streams. Within such a window, the contents of the stream can be color-coded to reflect its status. The codes may help to differentiate between, for example:

Flushed or not flushed

New output since last step or breakpoint and preexisting output

Some embodiments may include a color-coding key within the window.

In some embodiments, a JSP debugger can provide information to the JSP compiler for use when creating the JSP servlet. This can include information to create required interfaces and wrapper classes as required for the operation of the debugger. For example debugger specific information may need to be included in a JSP .class files to facilitate debugging.

In some embodiments, line numbers in the class file displayed by the JSP debugger can point to the source code file for the JSP. In some cases, only lines with user code (either tag library calls or programming language snippets) may be marked in the class file. As an example, lines in a JSP that just contain HTML may not have line numbers marked in the class file, since these are not code in the programming language. Such an embodiment can make the stepping behavior seem more natural to the developer.

In some embodiments, a source file name displayed and used in the class file is the file name of the programming language source code file for the JSP. The path used can be relative to the root of the project in the IDE.

In some embodiments, a compiler may only insert code for using the wrapper class ("writer" class) if debug symbols are turned on. Once this has been done, the servlet can be generated. At run-time, a generated servlet can call an invoke method, which may be a static method. This method may return a result indicating if the IDE is currently in debugging mode. If so, the wrapper class can be inserted at this time. If not, the server will remain unwrapped in the runtime environment.

In some embodiments a wrapper class can be defined by one or more abstract methods. In some cases, specific methods used for debugging operations on streams are implemented. For example a method that returns all of the bytes that have been written to the buffer, flushed and un-flushed may be used. Additional methods may be needed if it's too slow to fetch the whole page's content each time, and possibly for determining which contents are new.

In some embodiments, a debugger interface can be employed for view control and interaction. Such an interface can define the methods that the debugger uses to determine how to display the expression, and how to edit the expression's value. In some cases the debugger can determine the list of field implementations by a look up, possibly through the proxy. The look-up may provide the appropriate filers and may assign values to parameters for the view. The debugger interface com.bea.ide.debug.IDebugExpression view, for example, can be implemented by classes wishing to provide a particular abstract view of a physical structure using the Java programming language.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "content" is used for in the embodiments of the systems and methods described above, it will be evident that such concept can be interchangeably used with equivalent concepts such as, variable, field, and other suitable concepts; and while the concept "data structure" is used for in the embodiments of the systems and methods described above, it will be evident that such concept can be interchangeably used with equivalent concepts such as, entity, object, class, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method executed by a processor to provide a software debugging environment, comprising:

providing a software program containing at least one data structure with one or more contents, wherein the software program is a server page application running on one or more processor that allows for automatically generating one or more servlets in machine generated code in a programming language, wherein the machine generated code contains one or more underlying physical data structures that are used to represent the one or more contents of the at least one data structure, and wherein the machine generated code allows for further compilation into binary code before execution;

displaying and/or editing the one or more contents of the at least one data structure via at least one abstract view based on the one or more underlying physical data structures used to represent the one or more contents; and extracting and formatting, via at least one filter, the one or more contents from the underlying physical data structures and defining a displaying and/or editing property of the at least one abstract view via at least one filter, the at least one filter is used to extract data from and manipulate one or more contents in a buffer used to transmit and receive streaming data, wherein the at least one filter allows a user to view the at least one data structure in a data stream relative to one or more tag library associated with the server page application using intermediate data created by the one or more tag library, wherein the intermediate data created by the one or more tag library is not sent back to the data stream.

2. The method according to claim 1, further comprising:
allowing the one or more contents to be modified through the at least one abstract view; and
validating an input value to the at least one content against an allowed value for the at least one content.

3. The method according to claim 1, further comprising:
presenting the one or more contents of the at least one data structure without showing a physical implementation of the at least one data structure.

4. The method according to claim 1, further comprising:
selecting each of the at least one abstract view individually for display.

5. The method according to claim 1, further comprising:
displaying and/or editing the same one of the one or more contents via two or more of the at least one abstract view without being deadlocked.

6. The method according to claim 1, further comprising:
defining the at least one filter via configuration information stored in a file, which can be a file in a markup language.

7. The method according to claim 1, further comprising:
interactively performing at least one of:
selecting a subset of the at least one of abstract view for display; and
defining the displaying and/or editing property of the at least one filter.

8. The method according to claim 1, further comprising:
supporting the debugging of a server page and a machine generated servlet that implements the server page.

9. The method according to claim 8, further comprising:
extracting and displaying a code and/or a content of interest, and mapping them to a format used in a source code in a server page, for use with executing a servlet;
following an execution path through at least one level of redirection using at least one tag;
extracting and manipulating a streaming data from a content of a buffer used to transmit and receive the streaming data; and
setting at least one break point in a server page and stepping through the execution of the page based on the displaying property.

10. The method according to claim 9, wherein:
the streaming data can be extracted by inserting a wrapper or "writer" class around the servlet.

11. A computer-enabled system to provide for a software debugging environment, comprising:
one or more processor;
a software program containing at least one data structure with one or more contents, wherein the software program is a server page application running on the one or more processor that allows for automatically generating one or more servlets in machine generated code in a programming language, wherein the machine generated code contains one or more underlying physical data structures that are used to represent the one or more contents of the at least one data structure, and wherein the machine generated code allows for further compilation into binary code before execution;
at least one abstract view capable of displaying and/or editing the one or more contents of the at least one data structure based on the one or more underlying physical data structures used to represent the one or more contents; and
at least one filter capable of extracting and formatting the one or more contents from the one or more underlying physical data structures and defining a displaying and/or editing property of the at least one abstract view, the at least one filter is used to extract data from and manipulate one or more contents in a buffer used to transmit and receive streaming data, wherein the at least one filter allows a user to view the at least one data structure in a data stream relative to one or more tag library associated with the server page application using intermediate data created by the one or more tag library, wherein the intermediate data created by the one or more tag library is not sent back to the data stream.

12. The system according to claim 11, wherein:
the system is at least partially implemented using an objected-oriented language.

13. The system according to claim 11, further comprising:
at least one editor associated with the at least one abstract view capable of at least one of:
allowing the one or more contents to be modified through the at least one abstract view; and
validating an input value to the one or more contents against an allowed value for the one or more contents.

14. The system according to claim 11, further comprising:
at least one another abstract view is capable of presenting the one or more contents of the at least one data structure without showing a physical implementation of the at least one data structure.

15. The system according to claim 11, wherein:
each of the at least one abstract view can be individually selected for display.

16. The system according to claim 11, wherein:
two or more of the at least one abstract view are capable of displaying and/or editing the same one of the one or more contents without being deadlocked.

17. The system according to claim 11, wherein:
the at least one filter can be defined via configuration information stored in a file, which can be a file in a markup language.

18. The system according to claim 11, further comprising:
a component capable of interactively performing at least one of:
selecting a subset of the at least one of abstract view for display; and
defining the displaying and/or editing property of the at least one filter.

19. The system according to claim 18, wherein:
the component can be realized via an interface to an Integrated Development Environment (IDE).

20. The system according to claim 11, further comprising:
at least one component capable of supporting the debugging of a server page and a machine generated servlet that implements the server page.

21. The system according to claim 20, wherein:
the at least one component can perform at least one of:
extracting and displaying a code and/or a content of interest, and mapping them to a format used in a source code in a server page, for use with executing a servlet;
following an execution path through at least one level of redirection using at least one tag;
extracting and manipulating a streaming data from a content of a buffer used to transmit and receive the streaming data; and
setting at least one break point in a server page and stepping through the execution of the page based on the displaying property.

22. The system according to claim 21, wherein:
the streaming data can be extracted by inserting a wrapper or "writer" class around the servlet.

23. A machine readable medium having instructions stored thereon that when executed by a processor cause a system to:
provide a software program containing at least one data structure with one or more contents, wherein the software program is a server page application running on one or more processor that allows for automatically generating one or more servlets in machine generated code in a programming language, wherein the machine generated code contains one or more underlying physical data structures that are used to represent the one or more contents of the at least one data structure, and wherein the machine generated code allows for further compilation into binary code before execution;
display and/or editing the one or more contents of the at least one data structure via at least one abstract view based on the one or more underlying physical data structures used to represent the one or more contents; and
extract and format, via at least one filter, the one or more contents from the underlying physical data structures and defining a displaying and/or editing property of the at least one abstract view via at least one filter, the at least one filter is used to extract data from and manipulate one or more contents in a buffer used to transmit and receive streaming data, wherein the at least one filter allows a user to view the at least one data structure in a data stream relative to one or more tag library associated with the server page application using intermediate data created by the one or more tag library, wherein the intermediate data created by the one or more tag library is not sent back to the data stream.

24. The machine readable medium of claim 23, further comprising instructions that when executed cause the system to:
allow the one or more contents to be modified through the at least one abstract view; and
validate an input value to one or more contents against an allowed value for the at least one content.

25. The machine readable medium of claim 23, further comprising instructions that when executed cause the system to:
present the one or more contents of the at least one data structure without showing an physical implementation of the at least one data structure.

26. The machine readable medium of claim 23, further comprising instructions that when executed cause the system to:
select each of the at least one abstract view individually for display.

27. The machine readable medium of claim 23, further comprising instructions that when executed cause the system to:
display and/or edit the same one of the one or more contents via two or more of the at least one abstract view without being deadlocked.

28. The machine readable medium of claim 23, further comprising instructions that when executed cause the system to:
define the at least one filter via configuration information stored in a file, which can be a file in a markup language.

29. The machine readable medium of claim 23, further comprising instructions that when executed cause the system to:
interactively perform at least one of:
selecting a subset of the at least one of abstract view for display; and
defining the displaying and/or editing property of the at least one filter.

30. The machine readable medium of claim 23 further comprising instructions that when executed cause the system to:
support the debugging of a server page and a machine generated servlet that implements the server page.

31. The machine readable medium of claim 30, further comprising instructions that when executed cause the system to:
extract and display a code and/or a content of interest, and mapping them to a format used in a source code in a server page, for use with executing a servlet;
follow an execution path through at least one level of redirection using at least one tag;
extract and manipulate a streaming data from a content of a buffer used to transmit and receive the streaming data; and
set at least one break point in a server page and step through the execution of the page based on the displaying property.

32. The machine readable medium of claim 31, wherein:
the streaming data can be extracted by inserting a wrapper or "writer" class around the servlet.

33. A computer-enabled system embodied in a storage medium to provide a software debugging environment, comprising:
means for providing a software program containing at least one data structure with one or more contents, wherein the software program is a sewer page application running on one or more processor that allows for automatically generating one or more servlets in machine generated code in a programming language, wherein the machine generated code contains one or more underlying physical data structures that are used to represent the one or more contents of the at least one data structure, and wherein the machine generated code allows for further compilation into binary code before execution;
means for displaying and/or editing the one or more contents of the at least one data structure via at least one abstract view based on the one or more underlying physical data structures used to represent the one or more contents; and means for extracting and formatting, via at least one filter, the one or more contents from the underlying physical data structures and defining a displaying and/or editing property of the at least one abstract view via at least one filter, the at least one filter is used to extract data from and manipulate one or more contents in a buffer used to transmit and receive streaming data, wherein the at least one filter allows a user to view the at least one data structure in a data stream relative to one or more tag library associated with the server page application using intermediate data created by the one or more tag library, wherein the intermediate data created by the one or more tag library is not sent back to the data stream.

* * * * *

UNITED STATES PATENT AND TRADEMARK OFFICE
CERTIFICATE OF CORRECTION

PATENT NO. : 7,650,592 B2  Page 1 of 1
APPLICATION NO. : 10/784346
DATED : January 19, 2010
INVENTOR(S) : Josh Eckels et al.

It is certified that error appears in the above-identified patent and that said Letters Patent is hereby corrected as shown below:

On the Title Page Item (*) Notice: delete "725 days" insert -- 1004 days --.

On the Title Page Item (56) on page 2, under "U.S Patent Documents", line 12, after "Blakley et al." insert -- 726/5 --.

On the Title Page Item (56) on page 2, under "Other Publications", line 22, delete "Interoperabillity" and insert -- Interoperability --, therefor.

In column 6, line 9, before "will" delete "which".

In column 14, line 54, in claim 33, delete "sewer" and insert -- server --, therefor.

Signed and Sealed this

Fourteenth Day of September, 2010

David J. Kappos
*Director of the United States Patent and Trademark Office*